US006971689B2

(12) United States Patent
Jackson

(10) Patent No.: US 6,971,689 B2
(45) Date of Patent: Dec. 6, 2005

(54) FLUSH HANDLE ASSEMBLY

(75) Inventor: Frank T. Jackson, Lake Elsinore, CA (US)

(73) Assignee: Hartwell Corporation, Placentia, CA (US)

( * ) Notice: Subject to any disclaimer, the term of this patent is extended or adjusted under 35 U.S.C. 154(b) by 15 days.

(21) Appl. No.: 10/429,367

(22) Filed: May 5, 2003

(65) Prior Publication Data

US 2003/0213095 A1 Nov. 20, 2003

Related U.S. Application Data

(60) Provisional application No. 60/377,386, filed on May 3, 2002.

(51) Int. Cl.$^7$ ................................................ E05B 3/00
(52) U.S. Cl. ............ 292/336.3; 292/163; 292/DIG. 31; 70/208
(58) Field of Search ...................... 292/336.3, DIG. 31, 292/163; 70/208, 215–217

(56) References Cited

U.S. PATENT DOCUMENTS

| 2,104,838 | A | * | 1/1938 | Leonard | 292/1 |
|---|---|---|---|---|---|
| 2,239,301 | A | * | 4/1941 | Papst | 292/1 |
| 2,246,708 | A | * | 6/1941 | Wieben | 70/208 |
| 2,387,187 | A | * | 10/1945 | Smith | 70/97 |
| 2,474,519 | A | * | 6/1949 | Drzewiecki | 70/471 |
| 2,486,586 | A | * | 11/1949 | Brittain et al. | 292/1 |
| 2,570,160 | A | * | 10/1951 | Schoch | 70/208 |
| 2,622,430 | A | * | 12/1952 | Adams et al. | 70/470 |
| 2,747,906 | A | * | 5/1956 | Emmert | 292/92 |
| 2,772,110 | A | * | 11/1956 | Petrochko | 292/341.17 |
| 2,833,582 | A | * | 5/1958 | Henrichs | 292/336.3 |
| 3,698,215 | A | * | 10/1972 | Truhon | 70/152 |
| 3,786,657 | A | * | 1/1974 | Loikitz | 70/150 |
| 3,934,435 | A | * | 1/1976 | Gresham | 70/150 |
| 4,480,451 | A | * | 11/1984 | Fujiya | 70/92 |
| 4,487,440 | A | * | 12/1984 | Beijer | 292/336.3 |
| 4,510,779 | A | * | 4/1985 | Ahad | 70/208 |
| 4,898,408 | A | * | 2/1990 | Hauber | 292/7 |
| 4,986,576 | A | | 1/1991 | Anderson | 292/40 |
| 6,059,231 | A | | 5/2000 | Dessenberger, Jr. | 244/129.5 |
| 6,427,501 | B2 | * | 8/2002 | Ramsauer | 70/208 |

* cited by examiner

*Primary Examiner*—Brian E. Glessner
*Assistant Examiner*—Carlos Lugo
(74) *Attorney, Agent, or Firm*—Barnes & Thornburg LLP

(57) ABSTRACT

A handle assembly is configured to indicate the positioning of an external handle relative to an internal handle. The handle assembly is further configured to selectively lock the internal handle when the external handle is in a selected position.

16 Claims, 5 Drawing Sheets

FLUSH HANDLE ASSEMBLY

CROSS-REFERENCE TO RELATED APPLICATIONS

This application claims priority under 35 U.S.C. 119(e) to U.S. Provisional Application Ser. No. 60/377,386 filed May 3, 2002 which is expressly incorporated herein by reference.

BACKGROUND

The present disclosure relates generally to the field of handle assemblies and, more particularly, to a handle assembly utilized in a latch mechanism which secures an aircraft door to an aircraft structure.

According to the disclosure, a handle assembly is configured to secure an aircraft door to an aircraft structure. The handle assembly has an internal handle configured for actuation from inside the aircraft and an external handle configured for actuation from outside the aircraft.

The external handle has an extended, use position and a recessed, non-use or locked position. In its recessed, non-use locked position, the external handle is flush with the handle housing and the exterior of the aircraft.

According to the disclosure, an indicator is provided on the internal handle for indicating the position of the external handle. When the external handle is in its use position and has not been completely moved to the recessed, non-use position, the indicator provides an indication of such a condition, indicating the need to change such condition before flight. Furthermore, the indicator functions as a lock for preventing the inadvertent opening of the internal handle during flight.

Additional features of the disclosure will become apparent upon consideration of the following detailed description of an embodiment of the disclosed apparatus.

BRIEF DESCRIPTION OF THE DRAWINGS

The detailed description particularly refers to the accompanying figures in which.

DETAILED DESCRIPTION OF THE DRAWINGS

Figure 1:
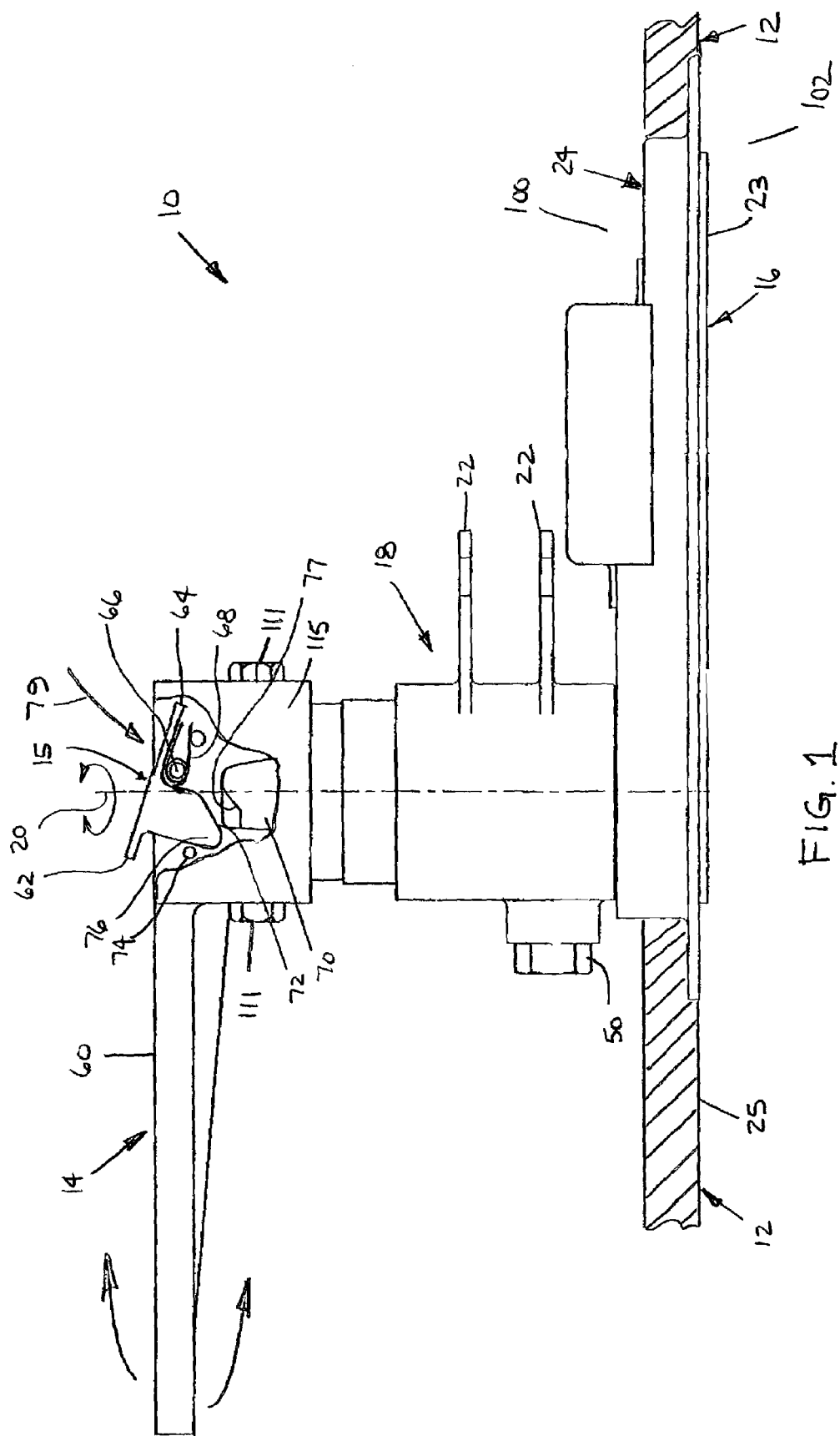
FIG. 1 is a top view of a door handle assembly showing, in a partially fragmentary section, an internal trigger in a depressed condition to unlocked the internal handle.

While the present disclosure may be susceptible to embodiment in different forms, there is shown in the drawings, and herein will be described in detail, an embodiment with the understanding that the present description is to be considered an exemplification of the principles of the disclosure and is not intended to limit the disclosure to the details of construction and the arrangements of components set forth in the following description or illustrated in the drawings.

Figure 2:
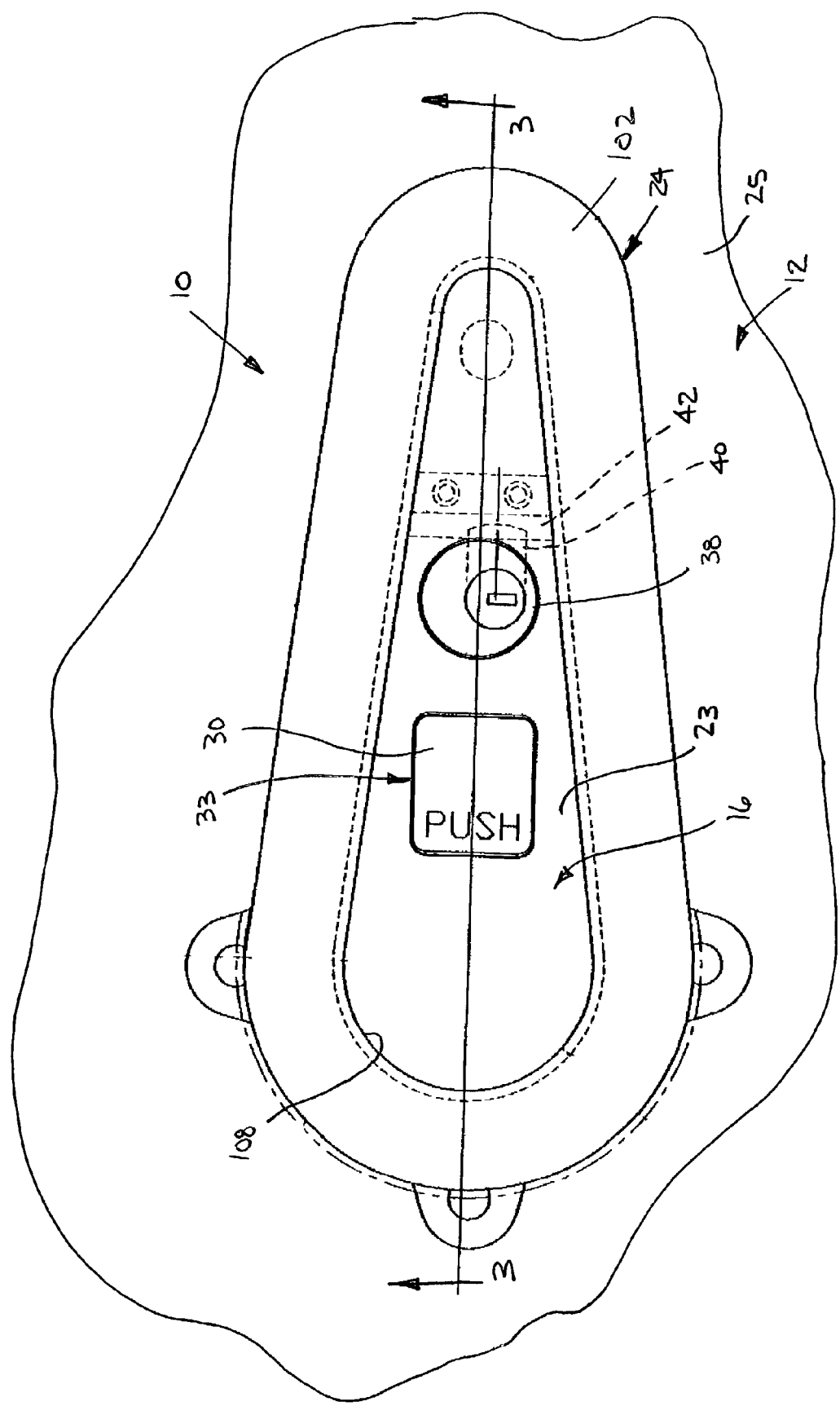
FIG. 2 is a front view of an external handle showing a lock and an external trigger used to release an external handle from a recessed position.
Figure 3:
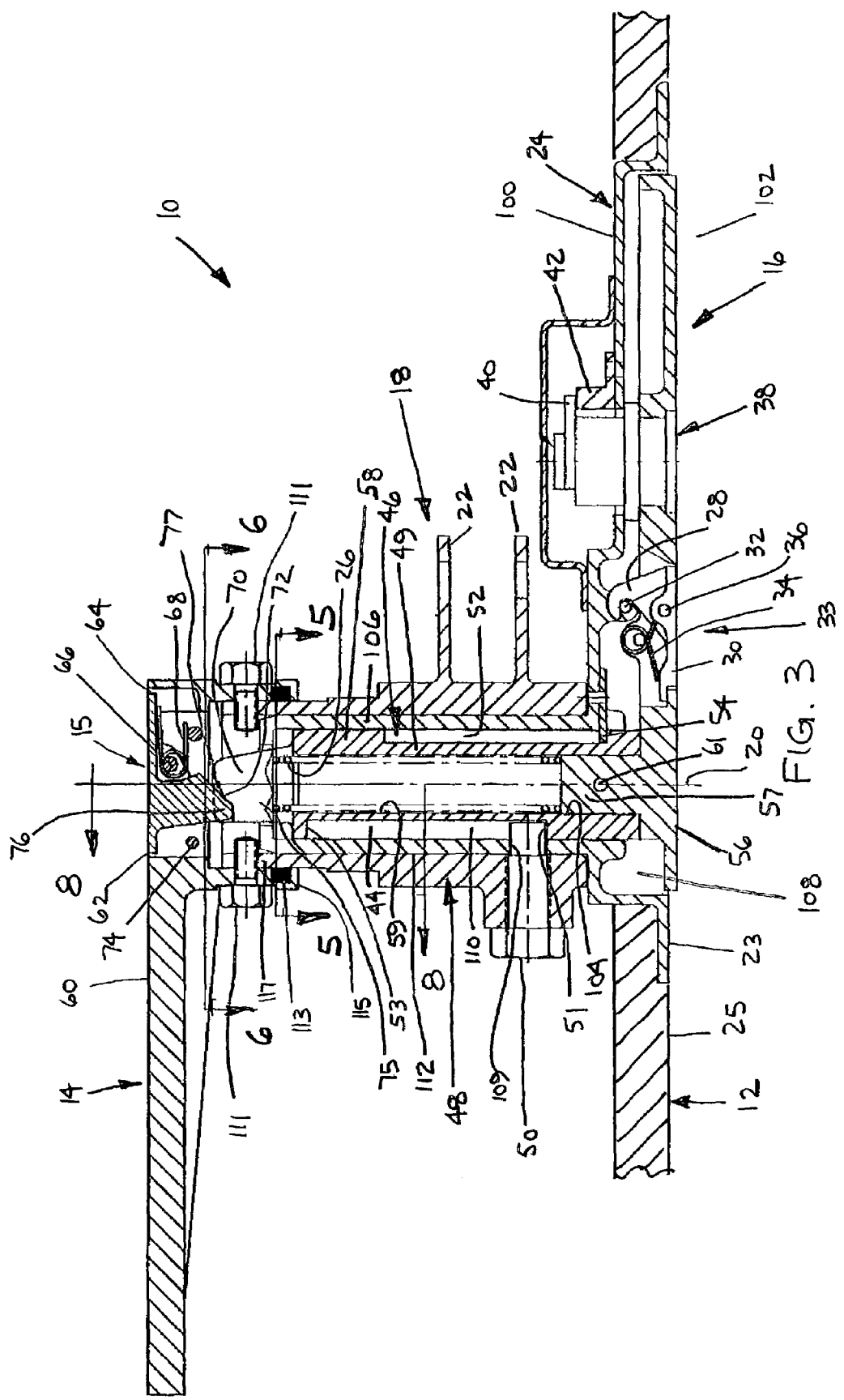
FIG. 3 is a sectional view of a handle assembly taken along line 3—3 in FIG. 2 showing the internal handle and the external handle it the recessed position and showing the internal trigger on the internal handle in the locked position.

As shown in FIGS. 1–3, a door handle assembly 10 is configured for actuating a latch mechanism in an aircraft door 12. It should be understood that while the disclosed embodiment depicts the handle assembly 10 being used in conjunction with an aircraft door 12, other uses for handle assembly 10 are within the scope of the disclosure.

Figure 4:
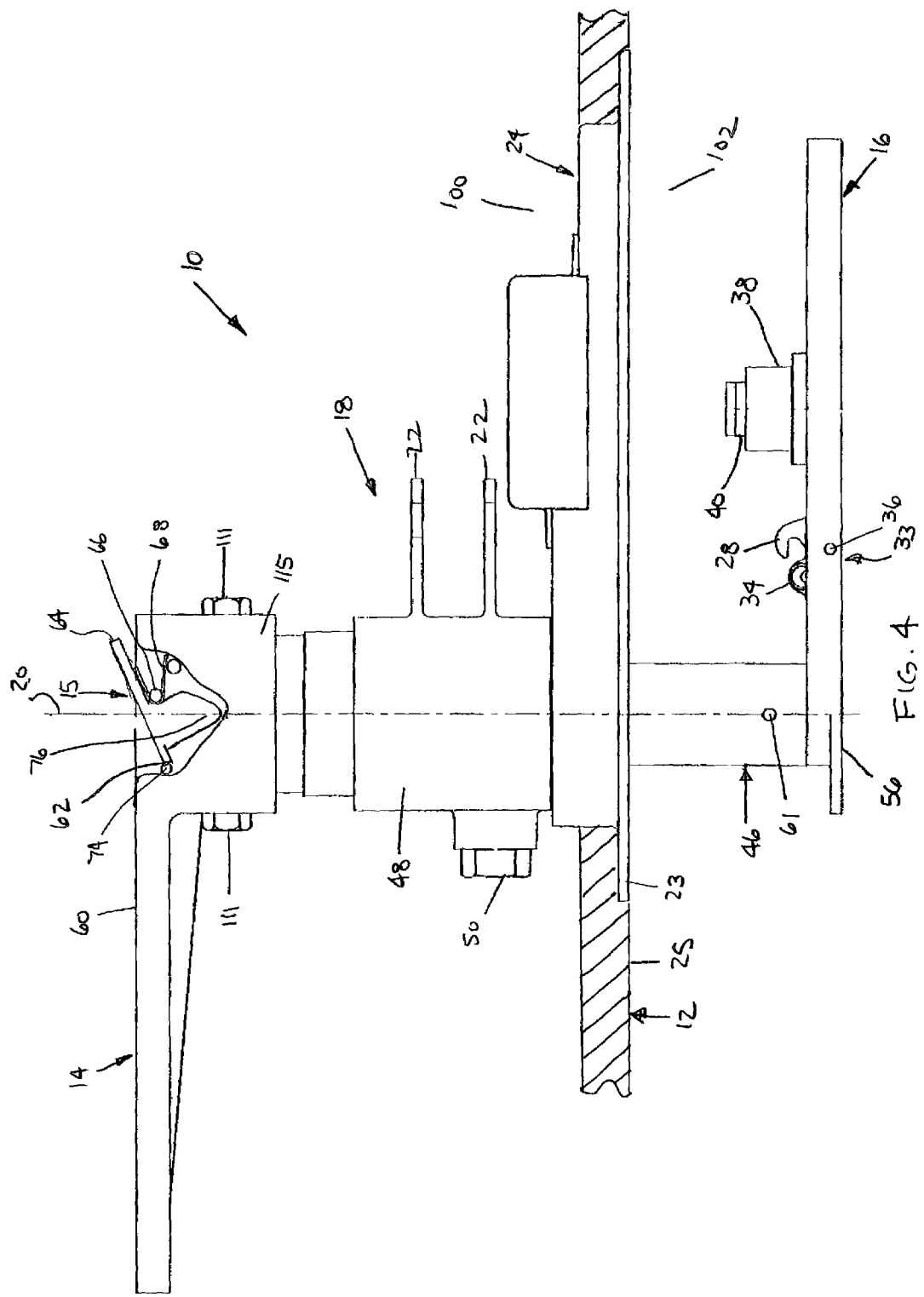
FIG. 4 is a top view of the door handle assembly of FIG. 1 showing the external handle unlocked from a housing and in the extended position, and which shows, in a partially fragmentary section, the internal trigger in a biased, unlocked position indicating that an internal handle is unlocked.

Handle assembly 10 includes an internal handle 14 and an external handle 16. External handle 16 has an extended, use position, as shown in FIG. 4, and a recessed, non-use position as shown in FIGS. 1 and 3. Internal handle 14 includes a trigger 15 which is configured to provide a visual indication of the position of external handle 16, as is discussed further below. Additionally, internal trigger 15 is configured to lock the internal handle 14 in place to prevent inadvertent actuation of handle assembly 10.

Handle assembly 10 illustratively includes an actuator 18 defining an axis 20, the actuator 18 having a plurality of transversely protruding ears 22. Ears 22 are configured to act as a mechanical interface between the handle assembly 10 and a standard latch mechanism to provide a secure locking of the door in the closed position. The handle assembly 10 of the present disclosure may therefore actuate a standard latch mechanism to open and close the aircraft door 12.

When external handle 16 is in the recessed, non-use position, as shown in FIGS. 1 and 3, external handle 16 is substantially flush or coplanar with outer surface 23 of handle housing 24 and the external surface 25 of the door 12. In the recessed, non-use position, handle assembly 10 can be actuated by internal handle 14 while external handle 16 remains stationary in handle housing 24, as is further discussed below.

External handle 16 is biased toward the extended, use position shown in FIG. 4 by spring 26 (seen in the sectional view of FIG. 3) when the trigger 15 is released. Illustratively, external handle 16 is held in the recessed, non-use position by the cooperation of hook 28, which extends from an external trigger 33 pushbutton 30. The hook 28 engages the retainer 32 which is connected to handle housing 24. Trigger 30 (and consequently hook 28) is biased toward the hooked position shown in FIG. 3 by spring 34. Accordingly, in order to disengage hook 28 from retainer 32, pushbutton 30 must be depressed such that it rotates about pin axis 36 and moves or disengages hook 28 away from retainer 32.

External handle 16 is further illustratively equipped with lock 38 which also secures external handle 16 in the recessed, non-use position. Lock 38 includes tab 40, which is movable between a locked position (shown in FIG. 3) and an unlocked position (shown in FIG. 4) by the actuation of lock 38 with a key (not shown). In the locked position, tab 40 is positioned behind wall 42. In the unlocked position, tab 40 is moved away from wall 42 and lock 38 is permitted to move freely without contact with wall 42. It should be understood that while external handle 16 illustratively includes both lock 38 and pushbutton 30 as mechanisms which secure external handle 16 in the recessed, non-use position, it is within the scope of the disclosure to utilize either lock 38 or pushbutton 30 as the only securing mechanism.

External handle 16 includes a male member 46. Internal handle 14 includes a female member 48 configured to encompass and receive male member 46. When external handle 16 is released from the recessed, non-use position, spring 26 biases external handle 16 away from internal handle 14 such that male member 46 of external handle 16 moves axially along axis 20 relative to female member 48 of internal handle 14. A channel 44 is formed in a side wall 49 of male member 46. The channel 44 is configured to receive stopper 50. The stopper 50 is carried on actuator 18 in engagement with the channel 44 for limiting the range or motion or travel of the male member 46 within the female member 48. In other words, the male member 46 can extend outwardly within the range defined by the first end 51 of the channel and second end 53 of the channel with the stopper extending in the channel 44. The stopper 50 also engages the channel 44 to cause the handles 14, 16 to operate synchronously. In this regard, engagement of the stopper 50 in the channel 44 keys the external actuator 18 to the male member 46. As such, when unlocked, rotation of the internal handle 14 causes rotation of the external handle 16 and likewise, rotation of the external handle 16 causes rotation of the internal handle 14.

A second channel 52 is formed in the side wall 49 of the male member 46 generally opposite the stopper 50 which operates with ledge or finger 54 to secondarily define a range of motion of male member 46 relative to the female member 48. The external handle 16 includes a boss 57 which extends into a bore 59 defined by the male member 46. A pin 61 extends through the boss 57 and the male member 46 to engage the handle 16 with the male member 46. Illustratively, channels 44 and 52 are connected at the portion that is proximal to the handle end 56 of external handle 16. This allows for internal handle 14 to be actuated (and not locked in place) when external handle 16 is in the recessed, non-use position. In contrast, at the far end of female member 48 (distal from handle end 56 of external handle 16), blocker 58 prevents rotational movement of internal handle 14 relative to external handle 16 when external handle 16 is in the extended, use position.

Handle assembly 10 includes the indicator or internal trigger 15 for indicating the status of external handle 16. Trigger 15 illustratively pivots about pivot post 66 which is secured to internal handle 14. When external handle 16 is in the recessed, non-use position, as shown in FIG. 3, trigger 15 is flush with end surface 60 of internal handle 14 such that generally neither first edge 62 nor second edge 64 of trigger 15 extends beyond end surface 60. Trigger 15 is biased by spring 68 such that second end 64 extends above end surface 60, as shown in FIG. 4, when external handle 16 is in the extended, use position. Trigger 15 is prevented from extending further above end surface 60 by the contact of first end 62 with stop pin 74. Such a position for trigger 15 is indicative that external handle 16 is in the extended, use position, and that it should be stowed in the recessed, non-use position prior to flight.

Figure 5:
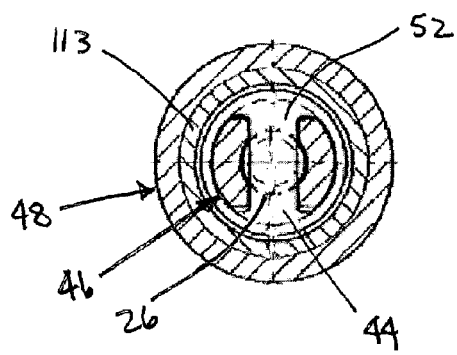
FIG. 5 is a cross-sectional view taken along line 5—5 in FIG. 3.
Figure 8:
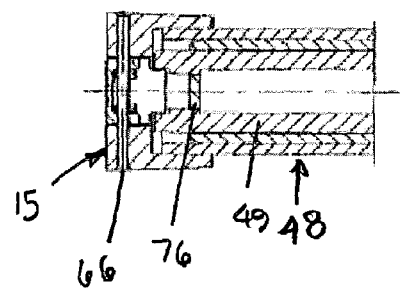
FIG. 8 is a cross-sectional view taken along line 8—8 in FIG. 3.
Figure 6:
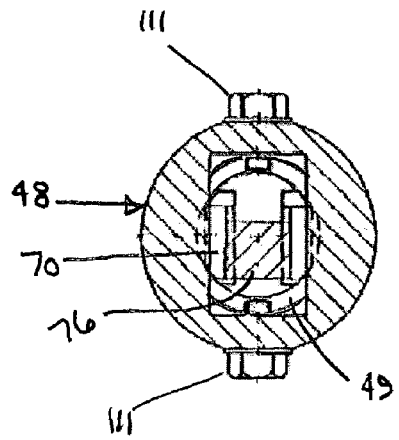
FIG. 6 is a cross-sectional view taken along line 6—6 in FIG. 3.
Figure 7:
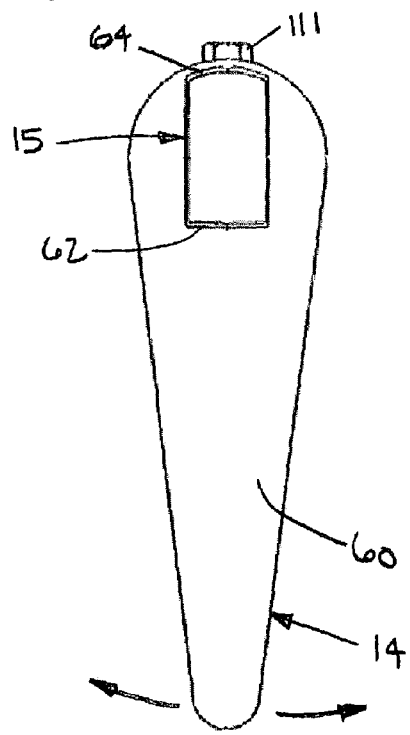
FIG. 7 is a front view of the surface of the interior handle.

With further reference to FIGS. 5, 6 and 8, when external handle 16 is moved to the recessed, non-use position, collar 70, which is illustratively formed integrally with external handle 16 on the interior end 75 of the male member 46, contacts trigger 15 at edge 72, thereby causing trigger 15 to be positioned flush with end surface 60, as shown in FIG. 3. Illustratively, trigger 15 includes a protrusion 76 which is formed to engage a recess 77 in collar 70.

Protrusion 76 functions to lock or prevent internal handle 14 from being actuated unintentionally. When external handle 16 is in its recessed, non-use position (i.e. when the plane is prepared for flight), it is desirable to have internal handle 14 locked in place and unable to be moved or actuated inadvertently. The cooperation of trigger 15, and particularly protrusion 76, with collar 70 provides this locking function. In order for protrusion 76 to be moved out of engagement with collar 70, second edge 64 of trigger 15 must be moved downwardly (see arrow 79 in FIG. 1) against the bias of spring 68 until protrusion 76 is clear of engagement with collar 70, as shown in FIG. 1. Such movement of trigger 15 can be caused by an operator's depression of trigger 15 near second edge 64. Once protrusion 76 is clear of blocking engagement with collar 70, internal handle 14 may be moved relative to external handle 16 so that handle assembly 10 may be actuated and aircraft door 12 opened.

Illustratively, the materials for all components are manufactured from carbon steel, heat treated and plated, or stainless steel, heat treated and passivated, or aluminum, anodic coated, or any other material known in the art.

The door handle assembly 10 is designed for attachment to a door 12 for locking and unlocking the door relative to another structure such as an airframe of an aircraft. In this regard, the actuator 18 is movable to engage the ears 22 with a standard engagement mechanism as known in the art. The door handle assembly 10 includes the housing 24 for attachment to the door 12. The housing defines an internal side 100 and an external side 102. The external handle 16 is positioned proximate to the external side 102 of the housing 24 and the internal handle 14 is positioned proximate to the internal side 100 of the housing 24. The actuator assembly 18 is coupled to and extends between the internal handle 14 and the external handle 16.

The actuator assembly 18 includes a first structure or male member 46 which is attached to the external handle 16 by means of the boss 57 engaging an internal surface 104 of the male member 46. The housing 24 includes a sleeve wall 106 which is an elongated generally tubular structure extending inwardly relative to the internal side 100 of the housing 24. The male member 46, attached to the external handle 16 projects into the housing 24 generally axially (20) into the sleeve wall 106. The housing 24 is formed with a recessed area 108 which communicates with a bore 110 defined by the sleeve wall 106. The recessed area 108 is generally formed on the external side 102 of the housing 24 to receive the external handle 16 therein to place the external handle generally flush with the outside surface 26. In other words, the external handle 16 generally nests in the recess 108 flush mounting with the surfaces 23, 25.

The female member 48 is positioned generally axially (20) over the sleeve wall 106. In other words, the female member 48 is a second structure of the actuator assembly 18 is attached to the internal handle 14. The female member 48 is positioned over the internal surface 112 (internal relative to the internal and external surfaces of the housing 24 as defined above). The female member 48 attached to the internal handle 14 can be rotated about the axis 20 when the trigger 15 is operated to disengage the protrusion 76 from the collar 70 of the male member 46. This allows controlled operation of the actuator assembly 18 by use of internal handle 14 while not unlocking or disengaging the external handle 16. In other words, the internal handle 14 can be operated independent of the operation of the external handle 16. In the event that the internal handle 14 is rotated out of the locked position as shown in FIG. 1, the protrusion 76 will not engage the collar 70 resulting in extension of the first end 62 away from the handle surface 60. As such, in this disengaged or unlocked position the trigger 15 acts as a flag or warning indicator to indicate to the appropriate user that the handle 14 is not fully engaged.

As further shown in the figures, the door handle assembly 10 includes the first lock or lock 38 which is carried on the external handle 16 for locking the external handle 16 to the housing 24 by means of the wall 42 being engaged with the locking tab 40. Generally, this first lock 38 is of known construction such as a keyed lock and designed with suitable mechanical and structural characteristics for the present application. A second lock or external trigger lock 33. The external trigger lock 33 includes the trigger pushbutton 30 which is spring 34 biased relative to the pin axis 36 to normally engage the hook 28 with the retainer 32. The external trigger lock 33 is engageable (hook 28 with retainer 32) for retaining the external handle 16 to the housing 24 to secure the door handle assembly 10 in a secured position.

The trigger 15 in the form of an internal trigger lock 15 is pivotally spring 68 biased about pivot post 66 to retain the edges 62, 64 generally flush with the surface 60 of the handle 14. Additionally, in this normally biased position the protrusion 76 engages the collar 70 to interfere and resist rotation of the handle 14 unless the trigger 15 is activated. In other words, the handle 14 cannot be rotated about the axis 20 when the external handle 16 is in the locked position as shown in FIG. 1. This is because the handle 16 is attached to the male member 46. In the locked position, the handle 16 cannot be rotated and hence the male member 46 cannot be rotated. As the male member 46 cannot be rotated the collar 70 is not rotatable and, as such, limits rotation of the handle 14 as a result of the protrusion 76 engaging the collar 70.

The internal handle 14 can be rotated even while the external handle 16 is locked only if the trigger 15 is operated to disengage the protrusion 76 from the collar 70. In this manner, pressure is applied to the trigger generally at the end 64 to compress the biasing spring 68 thereby pivoting the protrusion 76 relative to pivot post 66 and disengaging the protrusion 76 from the collar 70. Once the trigger 15 is operated the protrusion 76 clearing the collar 70 the handle 14, attached to the female member 48 can be rotated. Operation of the internal handle 14 in this manner allows the ears 22 to be disengaged from the latching mechanism thereby allowing internal operation of the internal handle 14 independent from the condition of the external handle 16. In this regard, the female member 48 rotates about the external surface 112 of the sleeve wall 106. If the external handle 16 is in a locked position, the external handle 16 will remain in the locked position even during actuation of the internal handle 14. If the internal handle 14 is to be operated to relock the ears 22 with the latching mechanism, the trigger 15 will show displacement of the end 62 until the protrusion 76 is reengaged with the collar 70. This feature acts as a flag or warning indicator to warn the appropriate user of the status of the locking engagement of the internal handle 14.

In using the external handle 16 to operate the actuator assembly 18, the first and second locks 38, 33 must be disengaged. In this regard, the first lock 38 can be disengaged with the second lock 33 acting as a backup. While the second lock 33 can be used to hold the external handle 16 in a desired locked position, the first lock 38 may be in the form of a keyed lock of known construction which provides the benefit of preventing inadvertent disengagement of the second lock 33. Once the locks 33, 38 are disengaged the spring 26 biases the male member 46 outwardly away from the housing 24. The spring 26 is compressible upon applying pressure to the latch to allow the male member 46 to be repositioned inside of the sleeve wall 106 for nesting the handle 16 in the recessed area 108.

The spring 26 shown herein is one embodiment of a broad range of biasing means which can be employed for this operation. The biasing means may be in the form of a compressible spring as shown, a tension spring which could be attached relative to the actuator assembly, a compressible material positioned in an appropriate position such as where the spring 26 is located or any form of biasing means which would provide an equivalent function to eject or cause the male member 46 to be extended outwardly away from the housing when the handle 16 is unlocked from the housing 24. It is in the scope of the present application that the biasing means be broadly interpreted to cover any form of biasing means which will provide the necessary function of ejecting the male member 46 when disengaged.

The female structure 48 includes the stop member 50 extending through a passage 109 in the sleeve wall 106 to engage a channel 44 formed on an exterior surface or side wall 49 of the male member 46. The passage generally extends horizontally, or perpendicularly to die axis 20 to allow the stop member 50 to rotate with the female member 48 about the axis 20. The male member 46 can extend from the sleeve wall 106 a distance which is limited when the end 53 abuts the atop member 50. Similarly, a stop member 54 is provided to travel in channel 52 to limit the axial extension of the male member 46 from the sleeve 106. The channels 44,52 cooperative limit the range of motion of the male member relative to the housing 24.

The handle 14 attaches to the female member by use of the fasteners 111. Other means for attaching the handle 14 to the female member 48 such as by welding or appropriate adhesives. Additionally, a gasket 113 is positioned between a body portion 115 of the handle which overlies a corresponding end 117 of the female member 48. The seal 113 provides a seal between the housing 24 and the interior surface in which the handle 14 is positioned.

In use, the door handle assembly 10 is attached to an appropriate door 12 to provide controlled engagement and disengagement of the actuator assembly 18 relative to a latching mechanism by means of the ears or other appropriate structure 22. The internal handle 14 can be operated independently of the external handle 16 to open the door 12 or disengage the actuator 18 independently from the condition of the external handle 16. In this regard, the typical use for this door handle assembly might be on an aircraft. The aircraft door may need to be secured from the outside thereby employing the lock 33 to retain the external handle 16 in a nested condition in the recess 108 of the housing 24. Additionally, a keyed lock 38 can be added or used in conjunction with the trigger lock 33 to maintain the stowed or secured position. When the entire assembly 10 is locked door 12 is held in a secure position.

However, it may be necessary to release the door from inside of the aircraft cabin thereby requiring operation of the internal handle 14 to disengage the actuator assembly 18. In this situation, the trigger 15 is operated by pressing on the end 64 to compress the biasing spring 68. By operating the trigger 15 in this manner, the protrusion 76 can be disengaged from the collar 70 thereby disengaging the handle 14 and the attached female member 48 for rotary movement about the axis 20. It should be noted that in this situation the external handle 16 remains in the locked position nested in the recess 108 with the collar 70 extending through the sleeve wall 106. However, by disengaging the trigger 15 relative to the collar 70 of the male member 46, the handle 14 and associated female member 48 can be operated. By operating the handle 14 and female member 48 relative to the axis 20 the ears 22 can be disengaged from the latch mechanism thereby disengaging the door 12. As such, the structure and function of the present door handle assembly 10 allows for internal operation of the assembly independent of the condition of the external handle and locking mechanisms 33, 38.

When the door is to be opened from the outside of the aircraft the locking mechanisms 33, 38 are disengaged. It should be noted that if the keyed lock 38 is used it generally will be disengaged first thereby releasing the "hard lock". After disengaging the keyed lock 38 the external trigger lock 33 can be operated by pressing on the trigger button 33 to rotate a hook 28 out of engagement with the retainer 32. Once the external trigger lock 33 is disengaged, the spring 26 or biasing means causes the male member to be urged outwardly from the bore 110 of the sleeve wall 106. By urging the male member 46 axially (20) outwardly from the bore 110, the collar 70 is disengaged from the protrusion 76. As such, in this condition, the external handle 16 operates independent from the internal handle 14. In this unlocked condition the door handle assembly 10 can be unlocked by activating the actuator 18 either from the inside by use of the internal handle 14 or from the outside using the external handle 16. Engagement of the stop member 52 with the male member 46 facilitates rotation or actuation of the actuator 18 about the axis 20 to disengage the ears 22 from the lock mechanism.

When the locking and unlocking operations are complete the handles 14 and 16 are returned to the as-stored condition with the male member retracted into the bore 110 compressing the spring 26 or biasing means related thereto. The handle 16 is nested into the recess 108 whereby the external trigger lock 33 includes engagement of the hook 28 with the retainer 32. When the trigger 33 is engaged, the key lock 38 can be operated to engage the tab 40 with the wall 42. It should be noted that if the trigger 33 is not engaged the spring 26 or biasing means will tend to urge the handle 16 away from the recessed area 108 thereby providing a clear indicator or flag that the handle is not in the proper stowed or locked condition. Similarly, if the collar 70 is not in the appropriate condition to be inserted between the protrusion 76 or if the handle 14 is out of alignment such that the protrusion 76 is not positioned in the collar the trigger 15 will be actuator providing a flag or indicator that the internal handle is not in the proper locked condition.

While a preferred embodiment of the disclosure is shown and described, it is envisioned that those skilled in the art may devise various modifications and equivalents without departing from the spirit and scope of the disclosure as recited in the following claims.

What is claimed is:

1. A door handle assembly for attachment to a door and for locking and unlocking a door, the door handle assembly comprising:
    a housing for attachment to a door, the housing defining an internal side and an external side of the door handle assembly;
    an external handle positioned proximate to the external side of the housing;
    an internal handle positioned proximate to the internal side of the housing;
    an actuator assembly coupled to and extending between the internal handle and the external handle;
    a first structure of the actuator assembly attached to the external handle;
    a second structure of the actuator assembly attached to the internal handle;
    at least one external lock associated with the door handle assembly for locking the external handle;
    an internal lock associated with the door handle assembly carried on the internal handle for locking the internal handle to prevent unintended actuation of the internal handle;
    the first structure cooperatively engaged with the second structure for rotating the external handle and internal handle when the at least one external lock is unlocked;
    the actuator including a retractable extender for urging the external handle away from the housing when the at least one external lock is unlocked and permitting retraction of the external handle when locking the at least one external lock; and
    wherein the internal lock is a pivotable trigger lock including a protruding portion for engaging the first structure to prevent rotation of the internal handle relative to the first structure to secure the door handle assembly in a secured position.

2. The door handle assembly of claim 1, wherein the at least one external lock associated with the door handle assembly further comprises:
    a second external lock carried on the external handle for retaining the external handle to the housing to secure the door handle assembly in a secured position.

3. The door handle assembly of claim 2, wherein the second external lock is a pivotable trigger lock including a hook carried on the external handle and a retainer carried on the housing, the hook being engageable with the retainer for retaining the external handle to the housing to secure the door handle assembly in a secured position.

4. The A door handle assembly for attachment to a door and for locking and unlocking a door, the door handle assembly comprising:
    a housing for attachment to a door, the housing defining an internal side and an external side of the door handle assembly;
    an external handle positioned proximate to the external side of the housing;
    an internal handle positioned proximate to the internal side of the housing;
    an actuator assembly coupled to and extending between the internal handle and the external handle;
    a first structure of the actuator assembly attached to the external handle;
    a second structure of the actuator assembly attached to the internal handle;
    at least one external lock associated with the door handle assembly for locking the external handle;
    an internal lock associated with the door handle assembly carried on the internal handle for locking the internal handle to prevent unintended actuation of the internal handle;
    the first structure cooperatively engaged with the second structure for rotating the external handle and internal handle when the at least one external lock is unlocked;
    the actuator including a retractable extender for urging the external handle away from the housing when the at least one external lock is unlocked and permitting retraction of the external handle when locking the at least one external lock;
    wherein the at least one external lock associated with the door handle assembly comprises a first external lock carried on the external handle for locking the external handle to the housing, and a second external lock comprising an external trigger lock, the external trigger lock including a hook carried on the external handle and a retainer carried on the housing, the hook being engageable with the retainer for retaining the external handle to the housing to secure the door handle assembly in a secured position;
    wherein the internal lock comprises an internal trigger lock including a protruding portion for engaging the first structure to prevent rotation of the internal handle relative to the first structure to secure the door handle assembly in a secured position; and
    whereby the internal trigger lock is selectively internally disengageable independent from the first external lock and the second external lock for selectively, independently operating the actuator from the internal side of the door handle assembly.

5. A door handle assembly for attachment to a door and for locking and unlocking a door, the door handle assembly comprising:
   a housing for attachment to a door, the housing defining an internal side and an external side of the door handle assembly;
   an external handle positioned proximate to the external side of the housing;
   an internal handle positioned proximate to the internal side of the housing;
   an actuator assembly coupled to and extending between the internal handle and the external handle;
   a male member of the actuator assembly attached to the external handle and projecting into the housing;
   a female member of the actuator assembly attached to the internal handle and generally, at least partially surrounding the male member;
   at least one external lock associated with the external handle for locking the external handle;
   an internal lock associated with the internal handle for locking the internal handle to prevent unintended actuation of the internal handle;
   the male member cooperatively engaged with the female member for rotating the first handle and second handle when the at least one external lock is unlocked;
   the actuator including a biasing means retained between the male member and the female member for retractably extending the male member and the attached external handle away from the housing when the at least one external lock is unlocked and permitting retraction of the male member into the female member and the external handle relative to the housing when closing a door to which the door handle assembly is attached; and
   the internal lock is a pivotable trigger lock including a protruding portion for engaging the male member to prevent rotation of the internal handle relative to the male member to secure the door handle assembly in a secured position.

6. The door handle assembly of claim 5, wherein the at least one external lock associated with the door handle assembly comprises:
   a first external lock carried on the external handle for locking the external handle to the housing to secure the door handle assembly in a secured position.

7. The door handle assembly of claim 6,
   wherein the at least one external lock associated with the door handle assembly further comprises:
   a second external lock carried on the external handle for retaining the external handle to the housing to secure the door handle assembly in a secured position.

8. The door handle assembly of claim 7, wherein the second external lock is a pivotable trigger lock including a hook carried on the external handle and a retainer carried on the housing, the hook being engageable with the retainer for retaining the external handle to the housing to secure the door handle assembly in a secured position.

9. A door handle assembly for attachment to a door and for locking and unlocking a door, the door handle assembly comprising:
   a housing for attachment to a door, the housing defining an internal side and an external side of the door handle assembly;
   an eternal handle positioned proximate to the external side of the housing;
   an internal handle positioned proximate to the internal side of the housing;
   an actuator assembly coupled to and extending between the internal handle and the external handle;
   a male member of the actuator assembly attached to the external handle and projecting into the housing;
   a female member of the actuator assembly attached to the internal handle and generally, at least partially surrounding the male member;
   at least one external lock associated with the external handle for locking the external handle;
   an internal lock associated with the internal handle for locking the internal handle to prevent unintended actuation of the internal handle;
   the male member cooperatively engaged with the female member for rotating the first handle and second handle when the at least one external lock is unlocked;
   the actuator including a biasing means retained between the male member and the female member for retractably extending the male member and the attached external handle away from the housing when the at least one external lock is unlocked and permitting retraction of the male member into the female member and the external handle relative to the housing when closing a door to which the door handle assembly is attached;
   the at least one external lock associated with the door handle assembly comprises a first external lock carried on the external handle for locking the external handle to the housing, and a second external lock comprising an external trigger lock including a hook carried on the external handle and a retainer carried on the housing, the hook being engageable with the retainer for retaining the external handle to the housing to secure the door handle assembly in a secured position;
   wherein the internal lock comprises an internal trigger lock including a protruding portion for engaging the male member to prevent rotation of the internal handle relative to the male member to secure the door handle assembly in a secured position; and
   whereby the internal trigger lock is selectively internally disengageable independent from the first external lock and the second external lock for selectively, independently operating the actuator from the internal side of the door handle assembly.

10. A door handle assembly for attachment to a door and for locking and unlocking a door, the door handle assembly comprising:
   a housing for attachment to a door, the housing defining an internal side and an external side of the door handle assembly;
   a recessed area defined on the external side of the housing;
   a sleeve wall on the housing extending internally of the recessed area of the housing, the sleeve wall defining a bore communicating with the recessed area;
   an external handle positioned proximate to the external side of the housing, the external handle configured for nesting in the recessed area on the external side of the housing;
   an internal handle positioned proximate to the internal side of the housing;
   an actuator assembly coupled to and extending between the internal handle and the external handle;

a male member of the actuator assembly attached to the external handle and projecting into the bore of the sleeve wall of the housing;

a female member of the actuator assembly attached to the internal handle and fitting over an interior surface of the sleeve wall of the housing;

at least one external lock associated wit the external handle for locking the external handle;

an internal lock carried on the internal handle for locking the internal handle to prevent unintended actuation of the internal handle;

means for engaging the male member with the female member for rotating the external handle and internal handle when the at least one external lock is unlocked;

the actuator including a biasing means retained in the sleeve wall bore for biasing the male member and the attached external handle outwardly away from the housing when the at least one external lock is unlocked and being compressible for permitting retraction of the male member into the sleeve wall bore and the external handle relative to the recessed area of the housing when closing a door to which the door handle assembly attached;

wherein the at least one external lock associated with the external handle comprises a first external lock carried on the external handle for locking the external handle to the housing, and a second external lock comprising an external trigger lock including a hook carried on the external handle and a retainer carried on the housing, the hook being engageable with the retainer for retaining the external handle to the housing to secure the door handle assembly in a secured position;

wherein the internal lock comprises an internal trigger lock including a protruding portion for engaging the male member to prevent rotation of the internal handle relative to the male member to secure the door handle assembly in a secured position; and whereby the internal trigger lock is selectively internally disengageable independent from the first external lock and the second external lock for selectively, independently operating the actuator from the internal side of the door handle assembly.

11. The door handle assembly of claim 10, further comprising:

at least one stop member carried on the actuator assembly for limiting the range of motion of the male member away from the housing.

12. The door handle assembly of claim 11, further comprising:

at least one channel formed in a side wall of the male member, the stop member being received in the channel for cooperatively limiting the range of motion of the male member relative to the housing.

13. The door handle assembly of claim 10, wherein the at least one external lock associated with the external handle comprises:

a first external lock carried on the external handle for locking the external handle to the housing to secure the door handle assembly in a secured position.

14. The door handle assembly of claim 13, wherein the at least one external lock associated with the handle further comprises:

a second external lock carried on the external handle for retaining the external handle to the housing to secure the door handle assembly in a secured position.

15. The door handle assembly of claim 14, wherein the second external lock is a pivotable trigger lock including a hook carried on the external handle and a retainer carried on the housing, the hook being engageable with the retainer for retaining the external handle to the housing to secure the door handle assembly in a secured position.

16. A door handle assembly for attachment to a door and for locking and unlocking a door, the door handle assembly comprising:

a housing for attachment to a door, the housing defining an internal side and an external side of the door handle assembly;

a recessed area defined on the external side of the housing;

a sleeve wall on the housing extending internally of the recessed area of the housing, the sleeve wall defining a bore communicating with the recessed area;

an external handle positioned proximate to the external side of the housing, the external handle configured for nesting in the recessed area on the external side of the housing;

an internal handle positioned proximate to the internal side of the housing;

an actuator assembly coupled to and extending between the internal handle and the external handle;

a male member of the actuator assembly attached to the external handle and projecting into the bore of the sleeve wall of the housing;

a female member of the actuator assembly attached to the internal handle and fitting over an interior surface of the sleeve wall of the housing;

at least one external lock associated with the external handle for locking the external handle;

an internal lock carried on the internal handle for locking the internal handle to prevent unintended actuation of the internal handle;

means for engaging the male member with the female member for rotating the external handle and internal handle when the at least one external lock is unlocked;

the actuator including a biasing means retained in the sleeve wall bore for biasing the male member and the attached external handle outwardly away from the housing when the at least one external lock is unlocked and being compressible for permitting retraction of the male member into the sleeve wall bore and the external handle relative to the recessed area of the housing when closing a door to which the door handle assembly is attached; and wherein the internal lock is a pivotable trigger lock including a protruding portion for engaging the male member to prevent rotation of the internal handle relative to the male member to secure the door handle assembly in a secured position.

* * * * *